May 7, 1940.　　　　T. A. HUTSELL　　　　2,199,405
BEER MEASURING AND DISPENSING DEVICE
Filed Dec. 17, 1937　　　4 Sheets-Sheet 1

INVENTOR
Thomas A. Hutsell
BY
Smith & Tuck
ATTORNEYS

May 7, 1940. T. A. HUTSELL 2,199,405
BEER MEASURING AND DISPENSING DEVICE
Filed Dec. 17, 1937 4 Sheets-Sheet 2

INVENTOR
Thomas A. Hutsell
BY
Smith & Tuck
ATTORNEYS

May 7, 1940.　　　　T. A. HUTSELL　　　　2,199,405
BEER MEASURING AND DISPENSING DEVICE
Filed Dec. 17, 1937　　　　4 Sheets-Sheet 3
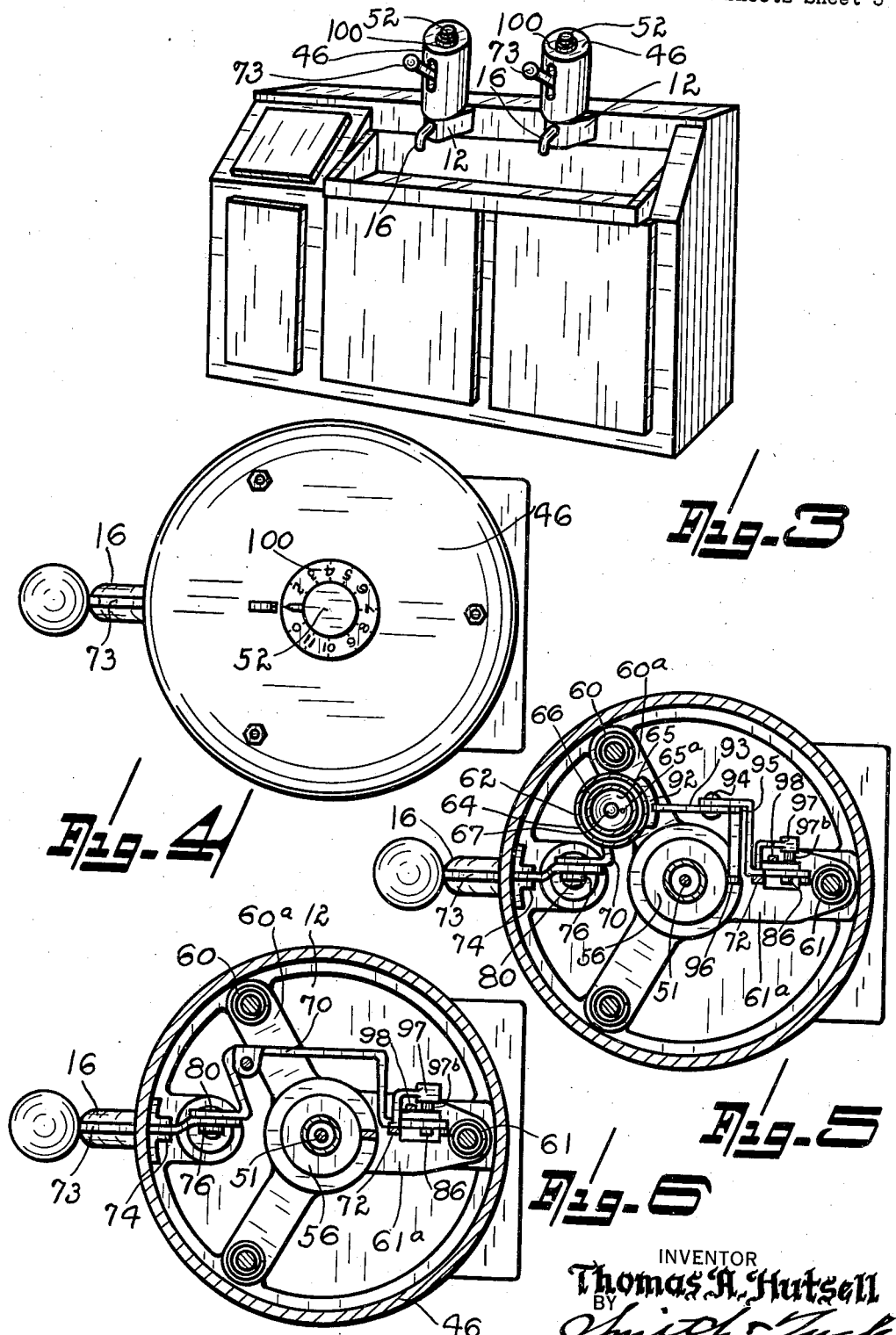
INVENTOR
Thomas A. Hutsell
BY
Smith & Tuck
ATTORNEYS

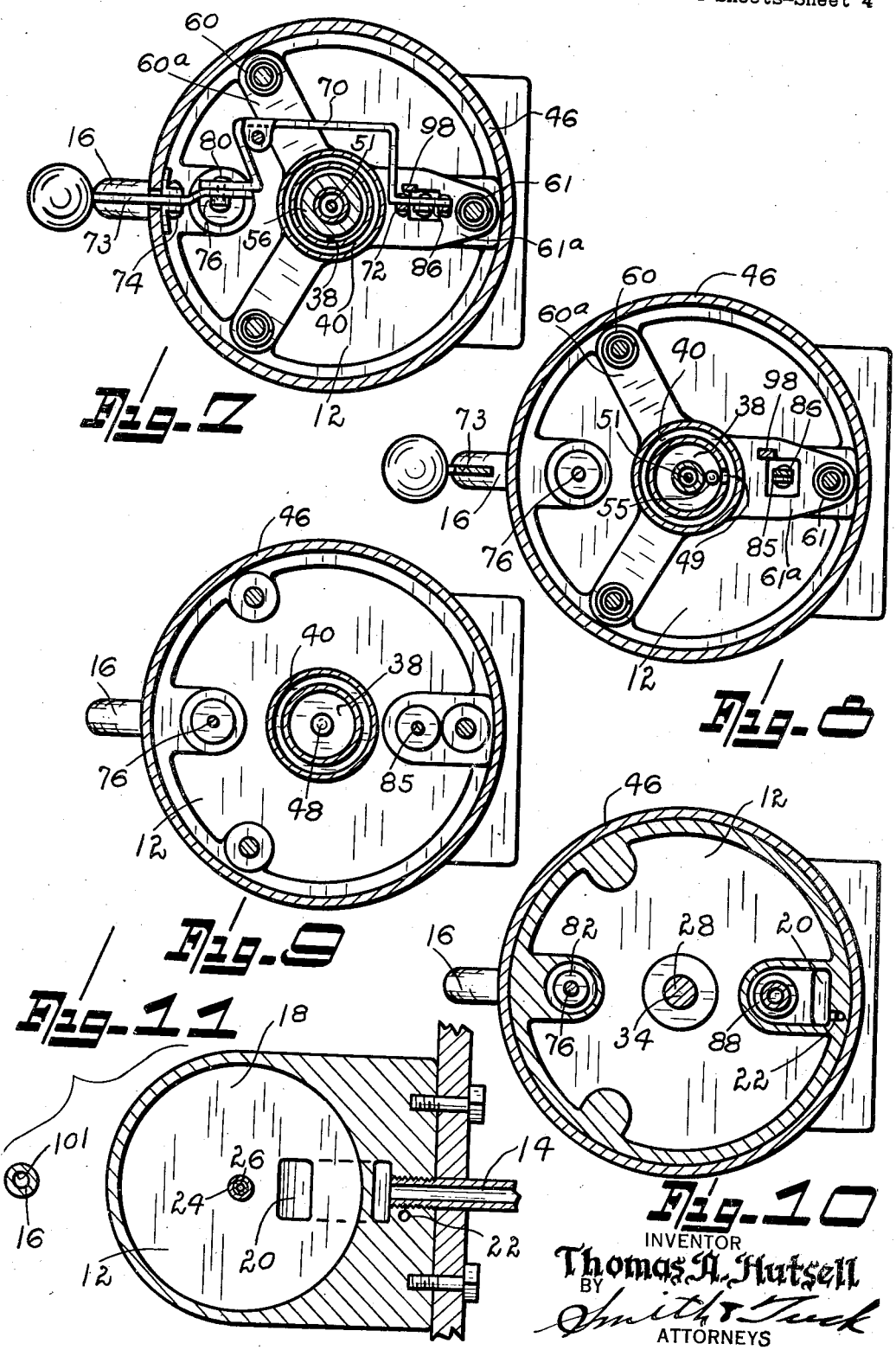

Patented May 7, 1940

2,199,405

UNITED STATES PATENT OFFICE 2,199,405

BEER MEASURING AND DISPENSING DEVICE

Thomas A. Hutsell, Seattle, Wash., assignor to Barmaster, Inc., Seattle, Wash., a corporation of Washington Application December 17, 1937, Serial No. 180,430

6 Claims. (Cl. 225—5)

The metering and dispensing of beer presents quite a perplexing problem and it is to provide equipment for meeting this situation that I have created my present machine.

Beer, normally, is produced under conditions that insure a certain percentage of included carbon dioxide in solution. Ordinarily, in the breweries the beer is kept at a low temperature and as a result a high percentage of carbon dioxide is dissolved in it. When the same is drawn into kegs for transportation and distribution it is normally placed in the keg at a low temperature and under considerable pressure so that the carbon dioxide content can be kept to any desired standard. As soon, however, as the keg is exposed to the higher temperature of the air and is jolted about and agitated, the pressure may rise considerably in the keg, it being well known that the higher the beer temperature the more gas it liberates and, further, turbulence tends to liberate gas. In the better establishments the keg beer is usually placed in a cold room so that all the beer to be served is reduced to a common standard so that the usual dispensing equipment, once carefully adjusted, will provide uniform results in drawing the beer for use. It is found, however, that even under such conditions, after a portion of the beer in the keg has been used the keg pressure will vary from the standard and, consequently, even under the most ideal conditions, considerable difficulty is experienced in drawing the beer without wastage.

Experience shows that the majority of beer dispensing establishments are not in a position to maintain their beer supply under ideal conditions and, as a result, experience a good deal of wastage and inconvenience in the actual drawing of their beer.

My equipment has, therefore, as its principal object the provision of means whereby beer of varying physical qualities can be reduced to standardized condition just prior to drawing, and in this manner without regard to the condition of the beer in the keg, a uniform draught can be maintained.

I accomplish this general result by first drawing beer from the keg into a primary chamber so as to insure an adequate supply of beer for accurate measuring. Secondly, the measuring chamber is adjusted to meter a predetermined quantity of beer, which is passed into the measuring chamber under keg pressure and under conditions that do not permit the formation of foam which would upset any careful measuring arrangement. When the beer has become quiescent it is then vented to the atmosphere so as to release all pressure above atmospheric. When this is done with the beer in a quiet state there is no tendency to produce foam. The next operation is to expel the beer in the same manner as though it were slowly poured out of a pitcher, or similar vessel, so that it will run out of the discharge spout in a solid stream, but without pressure and without turbulence. In this manner it is possible to deliver an exact quantity of beer which can be accurately measured and recorded on a suitable recording counter. I further provide means whereby the degree of turbulence in the beer as finally discharged can be varied so that the desired amount of foaming can be produced from the already accurately measured beer, and once the machine is adjusted for a given head of foam this head can be maintained for subsequent drawings.

Other and more specific objects will be apparent from the following description taken in connection with the accompanying drawings, wherein:

Figure 3 is a perspective view of a beer cabinet showing two of my devices as installed thereupon.

Figure 4 is a top plan view of my dispenser.

Figure 2:
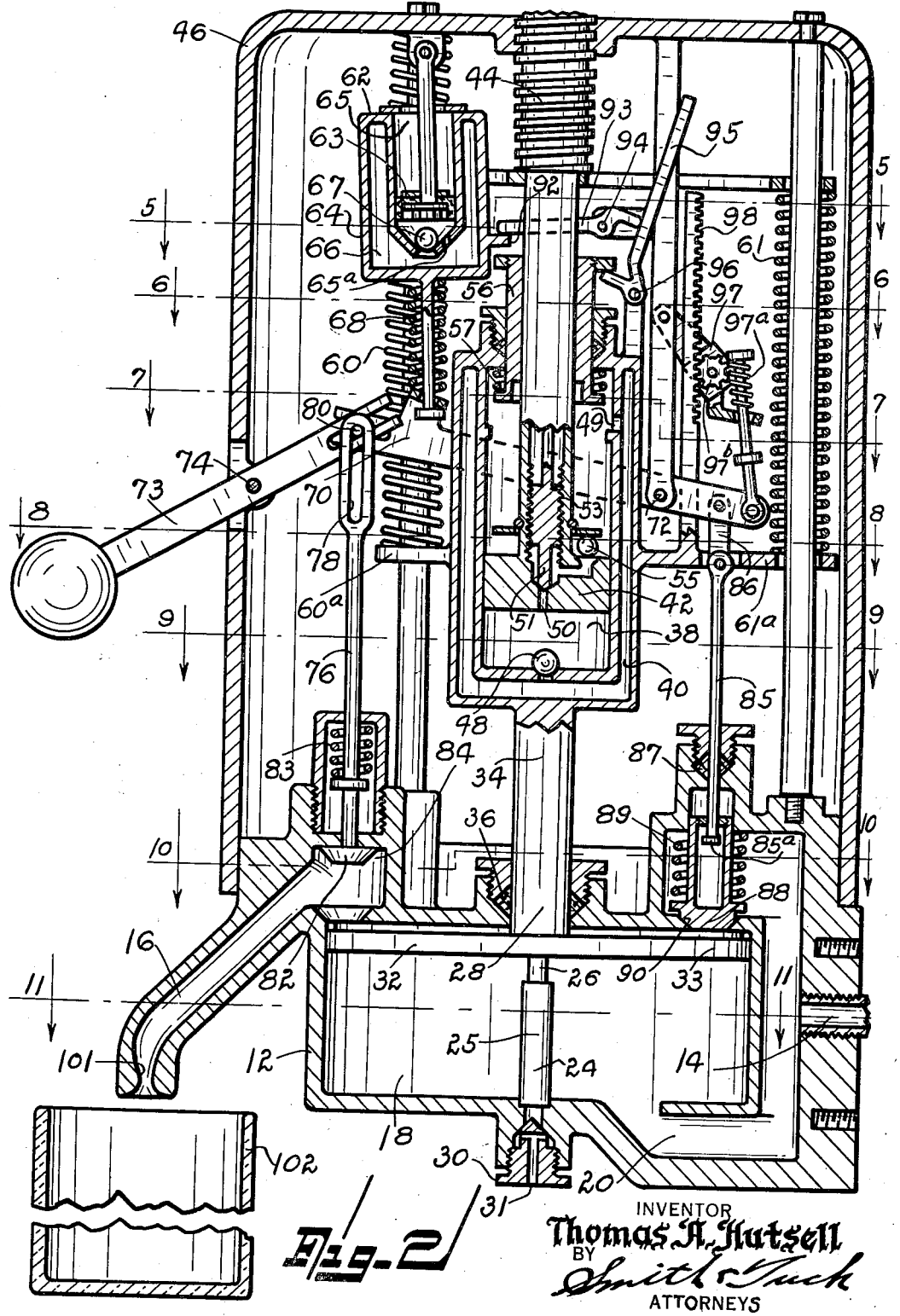
Figure 2 is a view similar to Figure 1 excepting the parts are shown as in the position assumed at the close of the dispensing cycle.

Figures 5, 6, 7, 8, 9, 10, and 11 are cross-sectional views taken along similarly numbered section lines of Figure 2.

Referring to the drawings, throughout which like reference characters indicate like parts, 12 designates the main housing of my device. This housing is provided with the beer supply line 14 and the discharge tap 16. Beer is forced into the housing 12 by virtue of the pressure on the keg and ultimately fills the circular chamber 18 and the by-pass 20. This chamber may be provided with insulation or cooling means if desired. Preferably formed also as part of housing 12, is the upper air bleeding duct 22 and the centrally disposed air bleeding arrangement at 24. This consists essentially of a lower tube 25 secured within the housing and an upper tube 26 which is secured within the piston assembly 28 and moves with it, telescoping within tube 25. A vent hole is provided at 29. Vent, or bleeder, control is provided by the adjustable nut 30 which is formed as a valve with a vent passage at 31, therethrough.

Disposed within cylinder 18 is the metering cylinder piston 32. This I have shown as being formed of two plates which give stiffness to the structure and provide a securing means for the obturating cup 33. Piston 32 is secured to the piston assembly 28 which has a reduced portion 34 passing through the upper head of cylinder 18 and being provided at that point with a packing gland 36. The upper portion of the piston assembly is formed as a dash pot having the inner chamber 38, an outer chamber 40, and an adjustable piston 42.

Piston 42 is held in its operating position by means of the threaded, upper portion 44, of the dash pot piston assembly, which is threaded into the fixed upper housing member 46. The lower portion of chamber 38 is closed by a ball check 48 and communication is provided between chambers 38 and 40 by vent 49 and passageway 50. This passageway is in turn closed by first the adjustable valve 51, which is externally adjustable by means of hand wheel 52, and the threaded lower portion at 53. The passageway is further closed by the ball check 55. Ball 55 is held in position during certain phases of the cycle by the sleeve retainer 56 which retainer is urged downwardly in engagement with ball 55 by compression spring 57. The metering piston assembly 28 is at all times urged downwardly by compression springs 60 and 61 acting upon lateral extension 60a and 61a, respectively, formed as part of assembly 28.

Control of piston assembly 28 is effected by a second dash pot arrangement denoted generally by 62. This unit has a fixedly positioned piston 63 and the movable cylinder assembly 64. This assembly is provided with an internal chamber 65 and a secondary chamber 66. Communication between the two is arrested during the dispensing cycle by the ball check 67. Cylinder 64 is urged upwardly by compression spring 68 which is backed up by the pivoted, operating lever 70. This lever is pivoted on the fixed pivot 72 which is supported from housing 46. Lever 70 is operatively connected to the operating handle 73 which is pivoted within housing 46 on the fixed pivot 74.

Also operatively connected to lever 70 is valve stem 76, which connection includes the elongated slot 78 adapted to engage pin 80 so that considerable movement of lever 70 occurs before valve stem 76 is raised thus lifting valve 82 off its seat into recess 84. The upper movement of valve 82 is resisted by compression spring 83 which normally maintains valve 82 on its seat.

At its opposite end lever 70 is connected to a valve operating rod 85 by link 86. The end of rod 85 passes through a packing gland 87 and into a hollow valve 88. The lower end of rod 85 is enlarged inside of valve 8 so that it, too, may have considerable movement before raising valve 88 up against its spring 89 which normally tends to seat it on its tapered seat 90.

Figure 1:
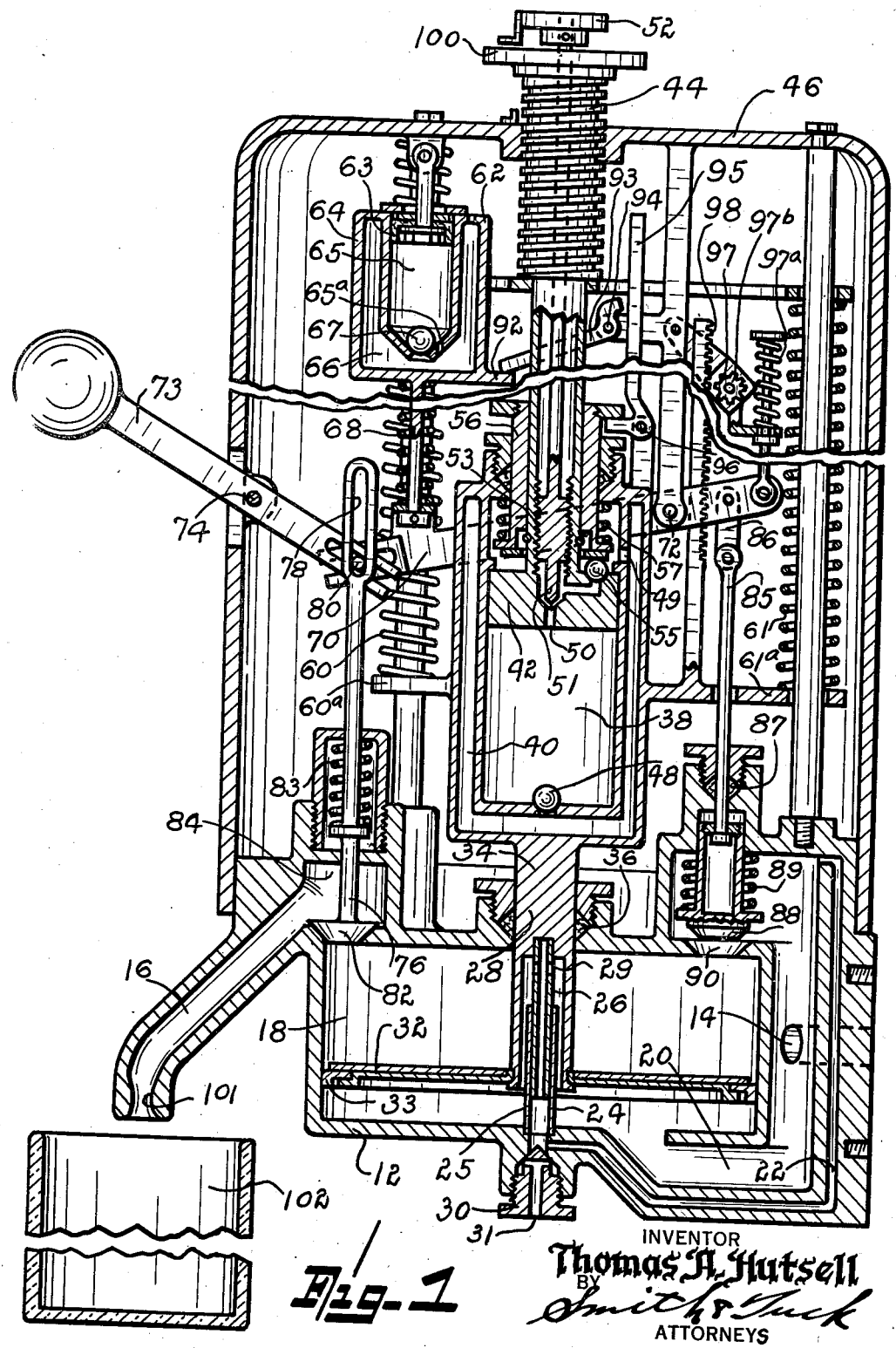
Figure 1 is a vertical, sectional view through a dispenser made after the teachings of my invention, the same being shown with the parts in the positions occupied during the charging of the measuring chamber.

As lever 70 is moved from its position shown in Figure 1 to the position of Figure 2, it moves cylinder 64 upwardly so that an extension thereof, as lug 92, engages lever 93 pivoted at 94. This movement operates bell crank 95 pivoted at 96 so as to raise member 56 upwardly against spring 57 so that the ball check 55 will be free to rise off its seat and permit the flow of liquid from chamber 38 out into chamber 40 through orifice 49 subject only to the control of valve 51.

In order to keep accurate count of the amount of beer dispensed I have provided a conventional counter mechanism at 97 which is controlled by the toggle spring unit 97a so that gear 97b engages rack 98 each time piston 32 travels upwardly, it being understood of course that rack 98 is fixedly secured to piston assembly 28 and, therefore, will register accurately the upward movement of piston 32 and thus give a true measure of the beer dispensed.

Method of operation

While the detailed description of the parts employed in my device may make it appear complicated, its actual operation is simple as the only control normally used is handle 73 which is moved from the position of Figure 1 to that of Figure 2 during the dispensing operation and then moved back to that of Figure 1. When it is desired to change the volume dispensed with each movement of handle 73, piston 32 is adjusted by means of hand wheel 100 which is secured to the threaded member 44, the only other manual control is hand wheel 52 which controls valve 51 and in turn actually controls the rate of beer discharged through nozzle 16 and consequently the amount of foaming produced. There is one other manual operation which occurs while the device is being charged for its initial operation.

When the dispenser is first put in operation with handle 73 in its upper, or closed, position chamber 18 is filled wtih air at atmospheric pressure. Beer under pressure from the keg is tapped into pipe 14 and before the beer can flow in and fill chamber 18 the air in the chamber and the connecting passageway must be expelled. This is accomplished by unscrewing the bleeder valve 30; then as the beer enters the chamber under normal keg pressure the air confined in chamber 18 above piston 32 will be displaced with beer and the air itself forced out through passageway 22 and finally out through passageway 31. The air in the chamber under piston 32 will be displaced by the incoming beer and will be forced out through opening 29, in the telescoping tube 26, down through tube 25 and then out, as before, through passageway 31. When the chamber is entirely bled of air, valve 30 should be again seated by screwing the same upwardly to its position of rest.

The device is now fully charged and ready for dispensing and the operator need merely pull downwardly on handle 73. The first operation will be the closing of valve 88 which is directly connected to lever 70 which is operated by lever 73 without loss of motion. This operation closes passage 90 and confines a measured quantity of beer above piston 32. The actual closing of valve 88 is accomplished by spring 89 which holds the valve in its closed position. This same first movement places the counting or registering mechanism 97 in operative position so that it immediately begins to record any upward movement of the piston 32. This mechanism is normally constructed to show each ounce, or fraction thereof, and to total each successive amount dispensed.

As the right end of lever 70, as viewed in Figures 1 and 2, moves downwardly the left hand end of the lever moves upwardly about pivot 72. It enters into a sequence of operation which delays the upward movement of piston 32 and its associated assembly until after valve 82 has been opened and a reasonable period of time has elapsed to permit the stabilizing of the beer in chamber 18 above piston 32. It will be noted that valve 88 is operated first as it is directly connected to lever 70. Next valve 82 is operated as soon as pin 80 has traversed the length of slot 78. During this interval, however, lever 70 in its upward movement has compressed spring 68 which then tends to urge cylinder 64 upwardly against the retarding action of piston 63. This upward movement is delayed by this dash pot arrangement while the oil within chamber 65 is discharged out through vent 65a into chamber 66.

As cylinder 64 is forced upwardly lug 92 carries with it the end of lever 93, this lever in turn bears against, and operates bell crank 95 which is pivoted at 96 in a manner to raise the sleeve-like retainers 56 against spring 57 and thus free check ball 55. As soon as the fluid within chamber 38 is free to flow out through passageway 50 and 49 into chamber 40 the entire cylinder assembly 34 carrying with it piston 32 is free for movement upwardly under urgence of the beer which is under keg pressure so as to discharge the beer out through the discharge nozzle 16. The rate of this discharge is controlled by the flow of the fluid out through passageway 50 and this in turn, once ball 55 is unseated, is controlled by valve 51. Valve 51 is subjected to manual adjustment by hand wheel 52.

It will be noted that spout 16 is restricted at 101 and the speed of delivery should normally be such that the beer discharged will pour over the seat of valve 82 and flow down spout 16 but normally not entirely filling this spout except at the restricted portion 101. In this manner beer can be discharged from cylinder 18 with the minimum of agitation and can thus be delivered if it is desired into glass 102 without foam. It has been found very desirable to raise valve 82 up into recess 84 so as to prevent any turbulence such as would be caused if the valve remained in the beer stream.

Normally, however, it is desirable to have a head of foam on a glass of beer. Consequently hand wheel 52 can be turned to so adjust valve 51 that the piston 32 can be speeded up in its delivery of the measured beer to the point where sufficient turbulence will be created to produce the amount of foam desired. With the adjustment of this control immediately before the operator where it can be quickly set, if conditions are known to have changed, the operator can control the discharge of the beer to suit the conditon of the moment.

As soon as the piston 32 has risen entirely to the top of chamber 18 and expelled all the beer from the same, the operator should then move handle 73 up again to the position shown in Figure 1. When this occurs lever 70 is partially revolved about pivot 72 in the reverse direction. Valve 82 is allowed to close under urgence of spring 83; likewise cylinder 64 follows lever 70 downwardly from the position shown in Figure 2 to that shown in Figure 1 and the oil that has normally been forced out of the inner chamber 65 is restored to this chamber from chamber 66 by raising ball 67 from its seat. Concurrently therewith valve crank 95 is free to return to its original position thus permitting spring 57 to again move sleeve 56 downwardly so as to again seat ball 55. The coil springs 60 and 61 now force the piston assembly 34 downwardly and as chamber 38 moves downwardly with respect to the fixed piston 42 the oil forced out through passageway 50 is restored to chamber 38 by the lifting of ball 48. During the downward movement of the piston assembly the counting mechanism 96 is removed from its operating position and does not record during the down stroke. During this cycle the enlarged head 85a of rod 85 lifts valve 88 off its seat against spring 89 so that, as piston 32 moves downwardly, the beer will be free to flow up passageway 20 and through the valve passageway 90 into the chamber above piston 32 so as to again charge the same ready for a subsequent delivery.

The amount of beer delivered is subject to adjustment by the threaded screw 44, operated by hand wheel 100, which is so arranged as to move piston 42 up or down in accordance with the amount of delivery desired for each cycle. As a matter of convenience screw 44 may be graduated in ounces so that exact setting can be made by the operator. Once set, however, the device will deliver the same number of ounces, or ounces and fractions thereof, until piston 42 is again reset to some other value.

The mechanism is thus again in position shown in Figure 1 and is ready to repeat its cycle.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. In a device for measuring and dispensing gas-charged liquids the combination of a metering chamber; a measuring piston disposed in said chamber for movement along a vertical axis; a liquid supply line; an intake valve communicating with the metering chamber above said piston; a by-pass connecting the chamber below said piston with the intake valve; a discharge valve located in the uppermost portion of said chamber; a fluid controlled retarding means for controlling the upward movement of said piston; means for adjusting said fluid control means adapted to predetermine the maximum travel of said measuring piston and the rate of such travel; compression springs disposed to urge the measuring piston downwardly and a second fluid control means adapted to effect the timing of the operation of said first fluid control means; and a manual control handle suitably connected to operate the intake valve, the second named fluid control means and the discharge valve automatically in proper phase relationship.

2. In a device for measuring and dispensing gas-charged liquids the combination of a metering chamber; a double-acting piston disposed in said chamber for movement along a vertical axis; a liquid supply line adapted to supply liquid to said chamber; an intake valve communicating with the metering chamber above said piston; a by-pass connecting the chamber below said piston with the intake valve; a discharge valve located in the uppermost portion of said chamber; a fluid controlled retarding means for controlling the upward movement of said piston; control means adapted to predetermine the maximum travel of said measuring piston and the rate of such travel; compression springs disposed to urge the measuring piston downwardly and a second control means adapted to effect the timing of the operation of said first fluid control means; a manual control handle operably connected to the device, and air venting means for the chamber below said piston and said by-pass.

3. In a device for measuring and dispensing gas-charged liquids the combination of a metering chamber; a liquid operated piston disposed in said chamber for movement along its axis; a liquid supply line adapted to supply liquid under pressure to operate said piston; an intake valve communicating with the metering chamber; a by-pass connecting the intake side of said piston with discharge side of said piston; a discharge valve located in the uppermost portion of said chamber; means for controlling the upward movement of said piston; means for adjusting said control means adapted to predetermine the maximum travel of said measuring piston and the rate of such travel; compression means disposed to urge the measuring piston against said liquid pressure and a second control means adapted to effect the timing of the operation of said first fluid control means; and a manual control handle, suitably connected, to operate the intake valve, the second named fluid control means and the discharge valve automatically in proper phase relationship.

4. In a beer dispensing apparatus, the combination with a housing, and its supply chamber under constant fluid pressure, a spring-depressed piston forming an upper dispensing-chamber in the supply chamber and adapted to be lifted by fluid-pressure, a supply passage exterior of the chambers opening through the lower wall of the supply chamber and the upper wall of the dispensing chamber, a spring-closed intake valve for the upper opening, a spring-closed dispensing valve also in the upper wall of the dispensing chamber, operating means for opening the dispensing valve, means for opening and holding open the intake valve, and means controlled by the operating means for releasing the holding means whereby the intake valve is closed before the dispensing valve is opened.

5. In a beer dispensing apparatus, the combination with a housing, and its supply chamber under constant fluid pressure, of a spring-depressed piston adapted to be lifted under fluid pressure and forming a dispensing-chamber in the upper part of the supply chamber, means for adjusting the piston to vary the capacity of the dispensing chamber, said supply chamber having an inlet port below the piston and said dispensing chamber having an intake port above the piston, a spring-closed intake valve for the intake port and means for opening said valve, a spring closed dispensing valve for the dispensing chamber, operating means for opening the dispensing valve, and means actuated by the operating means for releasing the intake valve opening means before the dispensing valve is opened.

6. In a beer dispensing apparatus, the combination with a housing, and its supply chamber under constant fluid pressure, of a spring-depressed piston forming an upper dispensing-chamber in the supply chamber and adapted to be lifted by fluid-pressure, a supply passage exterior of the chambers open to the lower part of the supply chamber and open to the upper part of the dispensing chamber, an interior vent tube rising from the bottom of the supply chamber, a ported vent tube mounted in the piston and telescoping with the first tube, and said housing having a vent duct extending from the first tube to an upper part of said passage, a spring-closed intake valve for the dispensing-chamber, a spring closed dispensing valve for the dispensing chamber, an operating means for the dispensing valve, means for opening, and retaining the intake valve in open position, and means actuated by the operating means for releasing the intake valve whereby the latter is closed preceding the opening movement of the dispensing valve.

THOMAS A. HUTSELL.